Inventor
John A. Malm.
By (signature)
Attorney

Feb. 11, 1930.    J. A. MALM    1,746,545
REVERSIBLE INERTIA TRANSMISSION
Filed Feb. 14, 1927    2 Sheets-Sheet 2

Inventor
John A. Malm.
By A. J. O'Brien
Attorney

Patented Feb. 11, 1930

1,746,545

UNITED STATES PATENT OFFICE

JOHN A. MALM, OF DENVER, COLORADO

REVERSIBLE INERTIA TRANSMISSION

Application filed February 14, 1927. Serial No. 167,975.

This invention relates to improvements in variable speed reversible inertia power transmission devices.

It is often desirable to transmit power from one shaft to another in such a manner that the driving shaft may rotate at a constant speed and deliver a constant torque to a driven shaft which supplies power to a variable speed device and whose speed of rotation is an inverse function of the torque which it must produce. Such transmission devices are useful in many places, but more especially in connection with automobiles which must traverse roads having a great variety of grades and which carry different loads at different times.

It is customary to provide automobiles with transmission gear sets that are manually shiftable and by means of which the transmission ratio between the driving and the driven shaft can be changed whenever necessary. Such gear sets are provided with means for effecting only a very few changes and therefore do not permit the motor to run at the most efficient speed at all times and besides this, such gear sets must be constantly shifted.

It is the object of this invention to produce a transmission mechanism that will automatically vary the gear ratio between the driving and the driven shafts so that the speed of the driven shaft multiplied by the torque which it delivers will always be equal to the speed of the driving shaft multiplied by its torque minus the loss in the transmission device and which, at the same time, will rotate the driven shaft at the maximum speed possible under the conditions.

It is a further object of this invention to produce a transmission device that permits the relative direction of rotation of the driving and the driven shaft to be reversed when necessary.

The above and other objects that may become apparent as the description proceeds are attained by a mechanism, which, briefly described, consists of two aligned, relatively rotatable shafts mounted for rotation and held against relative longitudinal movement. A flywheel carried by said shafts in such a manner that it may rotate and move longitudinally with respect to both of the shafts and means for causing the flywheel to reciprocate when the shafts rotate relative to each other, together with a brake mechanism by means of which the flywheel may be retarded so as to reverse the relative rotation of the shafts.

In order more fully to describe my apparatus and its operation, reference will now be had to the accompanying drawings in which it has been illustrated, and in which:—

Figure 1:
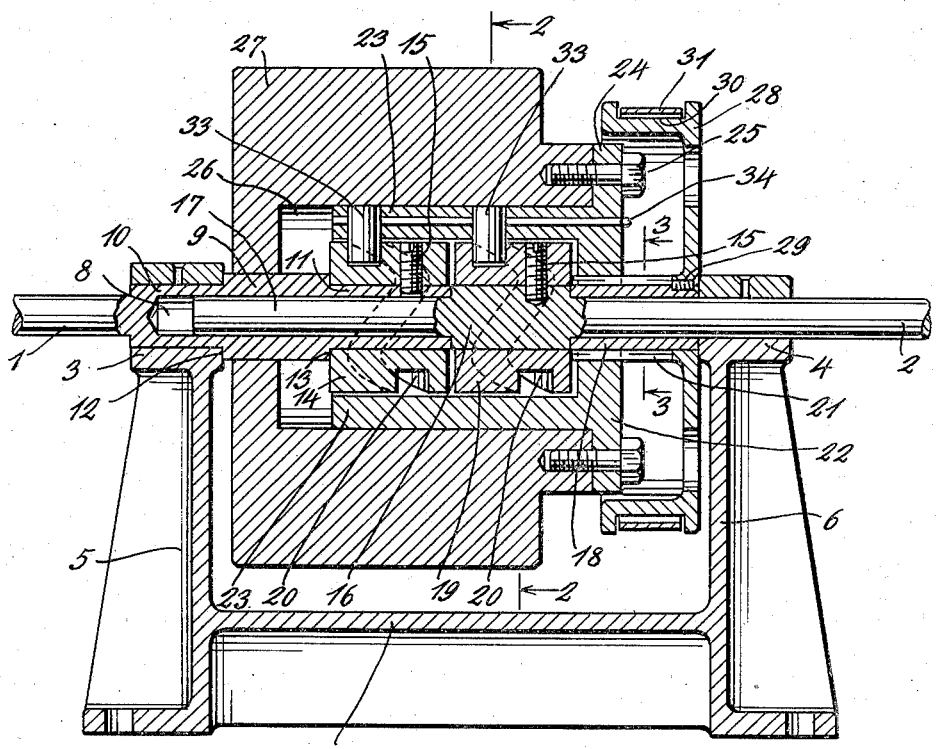
Fig. 1 is a longitudinal diametrical section of my improved reversible inertia transmission.
Figure 2:
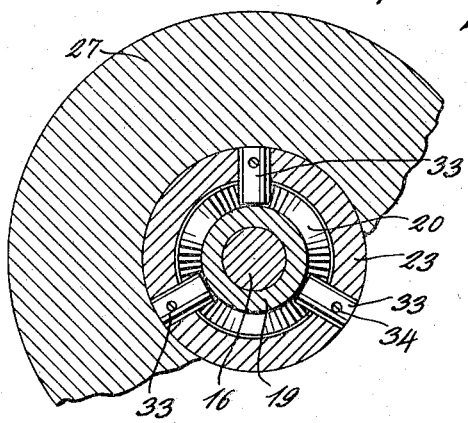
Fig. 2 is a section taken on line 2—2, Fig. 1, the flywheel being shown partially broken away.

For the purpose of illustrating and describing this invention, the driving shaft 1 and the driven shaft 2 have been shown as journalled in bearings 3 and 4, which are formed in the upper ends of the uprights 5 and 6 that project upwardly from the base 7. In this description shaft 1 will be considered to be the driving shaft and 2 the driven shaft, but I want it distinctly understood that this may be reversed and shaft 2 be the driving shaft.

Shaft 1 is provided with an axial opening 8 and has a cylindrical section 9 of somewhat larger diameter than the adjacent portions 10 and 11, so as to form two shoulders 12 and 13. A cam member 14 is secured to the part 11 by means of a screw 15. Shaft 2 is also provided with a section 16 of larger diameter than the shaft 2 and an extension 17 which is journalled in the opening 8. The shoulder between sections 16 and 17 engages the end of the hollow part 11 and the shoulder between 12 and 2 abuts the end of the sleeve 18. The other end of sleeve 18 abuts the end of the bearing 4. Shoulder 12 and sleeve 18 hold the shafts 1 and 2 against relative longitudinal movement. A cam 19 which can be but is not necessarily identical in shape and size with cam 14 is secured to section 16 by means of a set screw 15. Each of these cams has a parabolic groove 20 which, in the embodiment shown, has six nodes but which may have a smaller or greater number of nodes. The sleeve 18 is provided with a plurality of splines 21 which cooperate with corresponding grooves in the hub 22, which is integral with the sleeve 23. A flange 24 extends radially outwardly from the sleeve 23 in the plane of the hub and is provided with a plurality of openings for the reception of the bolts 25 by means of which the sleeve 23 is secured in place in the cylindrical chamber 26 of the fly-wheel 27. A wheel 28 is secured to the end of sleeve 18 by means of screws 29 and has a cylindrical surface 30 with which the brake band 31 cooperates. I have not shown any means for contracting the brake band as I contemplate employing any of the old and well known means for this purpose. The flywheel 27 has an axial opening of the proper size to fit slidably on the part 9 of shaft 1.

Sleeve 23 is provided with three pairs of steel pins 33, which, in the example shown, are spaced 120 degrees apart, about the axis of the cylinder, and are so spaced longitudinally that they engage corresponding portions of the cam grooves 20. As explained above, the cams and the cam grooves are identical so that if we suppose that the cams are arranged with the corresponding nodes in the same diametrical plane and held against relative rotation that the flywheel may be rotated about the common axis of the shafts. The pin 33 will follow the grooves and therefore the flywheel will be forced to reciprocate as the pins pass from one node to the other. The pins 33 have been shown as held in place by means of a rod 34.

Let us now assume a case in which shaft 1 is rotated by some suitable motor and that shaft 2 is free to rotate. If we increase the angular speed of shaft 1 very slowly, the flywheel 27, as well as shaft 2, will be made to rotate at the same angular speed and the whole assembly will therefore rotate as a unit. Let us now assume that a load is gradually applied to shaft 2, which tends to stop its rotation. Shaft 2 will begin to lag behind shaft 1 and there will be relative rotation between cams 14 and 19. As soon as the cams begin to rotate relative to each other, the flywheel will begin to reciprocate because the distance between the two pins 3 of each pair is fixed. This also necessitates a relative rotation of the flywheel about shaft 1, for otherwise there can be no reciprocation. If we clamp the shaft 2 against rotation, but leave the flywheel free to rotate as well as to reciprocate, the flywheel will make one-half of a revolution to each revolution of shaft 1, because and since there are six nodes the flywheel must rotate 60 degrees in passing from one node on the stationary cam 19 to the next node or from node X to node Y in Fig. 4 and during this movement of the flywheel cam 14 must rotate through 120 degrees so that node $a$ will lie in the same diametrical plane as node Y. Since the cam 19 is not rotating, in the case under consideration, the flywheel 27 will reciprocate three times during each revolution of the drive shaft. If shaft 2 is permitted to rotate, but at a slower speed than shaft 1, the flywheel will rotate at a smaller speed relative to shaft 1 than when shaft 2 is held against rotation and at the same time it will reciprocate at a lower rate.

From the above it will be observed that when the shaft 2 is free to rotate, the flywheel will rotate at the same speed as shaft 1 and will not reciprocate and that when shaft 2 is held against rotation, the flywheel will rotate at one-half the speed of shaft 1 and reciprocate at the maximum rate. Since it requires considerable force to reciprocate the flywheel, it is evident that this force must be produced by the interaction between the pins 33 and the walls of the cam groove 20 in cam 19 and that this force is a direct function of the rate at which shaft 2 lags with respect to shaft 1, for it has been shown that when the lag is zero, the flywheel does not reciprocate and that when the lag is the maximum the rate of reciprocations are the maximum. Since inertia and momentum vary with the square of the velocity, it is evident that the force must be quadrupled in order to double the rate of reciprocation.

From the above explanation, it is apparent that if shaft 1 is rotated at a constant speed and shaft 2 is connected with a variable load, it will be rotated at such a speed that the angular speed multiplied by the torque will be equal to the power required to reciprocate the rotating flywheel at the corresponding rate.

Figure 4:
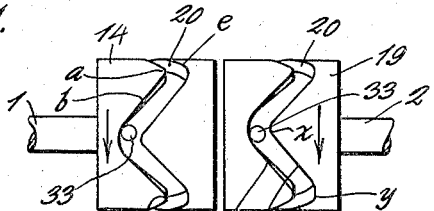
Fig. 4 is a diagrammatic representation of the cams and interconnecting rollers and is intended to illustrate the operation.

In order to explain the operation in a different way, reference will now be had to Fig. 4 in which it is assumed that cam 14 is rotated in the direction of the arrow by means of a motor. Pins 33 are rigidly connected one to the other as explained above. Shaft 2 is rotatable but subject to considerable friction or to some other load. It is now evident that the side $b$ of the cam groove 20 in cam 14 will engage the pin 33 and subject the latter to a force. This force acts perpendicular to the side of the cam groove and can be resolved into two components, one of which extends parallel with the axis of rotation and which tends to reciprocate the flywheel and the other of which acts in a plane at right angles to the axes and represents the torque. The pin 33 in the cam groove of cam 19 will now engage the side C with a force that can be resolved into two components, one of which is parallel with the axis of rotation and the other of which acts in a plane perpendicular to the axes and represents the torque which tends to rotate the shaft 2. Since the forces referred to are dependent on the moment of inertia of the flywheel, it is evident that they will vary directly as the mass and directly as the square of the velocity or as the square of the frequency of the reciprocation. After the pins have passed nodes $a$ and $y$ the reactions will be between the pins and sides $e$ and $f$. If the load increases, the frequency of reciprocation must increase so as to develop the necessary torque and therefore there must be an increase in the relative rotation of shafts 1 and 2, which means that the rotary speed of shaft 2 will decrease as the load increases. This device therefore functions to automatically change the transmission ratio between shafts 1 and 2 in accordance with the load.

This device also possesses the properties of being adapted to reverse the direction of rotation of shaft 2 without reversing shaft 1. This is accomplished in the following manner.

Figure 5:
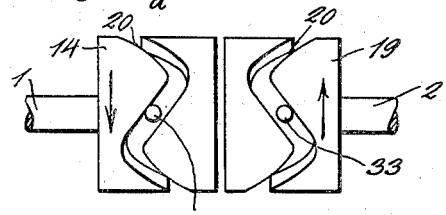
Fig. 5 is similar to Fig. 4 and shows the shafts rotating reversely.
Figure 3:
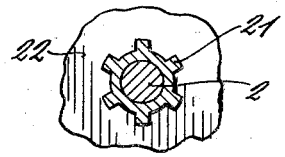
Fig. 3 is a section taken on line 3—3, Fig. 1.

Let us assume that the parts are rotating in the same direction, as above described, and that the pins 33 are in the position shown in Fig. 4. As above explained, it is possible to clamp the flywheel against rotation and in this case shafts 1 and 2 will have to rotate at the same speed (but not necessarily in the same direction). Under normal operation, the flywheel rotates in the same direction as shaft 1, but at a slower angular speed. In this case the cam 19 is rotated in the same direction as cam 14, for reasons explained. If we now apply the brake 31 to the wheel 28, we increase the torque required to rotate it and therefore the flywheel will lag more with respect to shaft 1 and thereby be forced to reciprocate at a greater rate. This increase in the rate of reciprocation will force pin 33 against the side $g$ of the cam groove in cam 19 (Fig. 4) and this force is resolved into two right angular forces, one of which represents a torque tending to rotate the cam 19 in the direction of the arrow in Fig. 5. Shaft 2 will now be gradually brought to rest and its direction of rotation reversed. When the brake is released, the rate of reciprocation will be reduced and shaft 2 will again be reciprocated in the same direction as shaft 1.

In the above description the cam grooves have been described as being identical in shape and size but this is not necessary. One cam groove may have six nodes, as shown, and the other one nine, or it may have four nodes. In the latter case the pins 33 must be placed diametrically so as to cooperate with the cam groove. In Letters Patent 1,525,038 granted to me on February 3, 1925, I have explained in detail the operation of a similar device having cam members whose cam grooves have different numbers of nodes and will therefore not offer any further explanation than to say that the relative rotation between each cam member and the flywheel for each reciprocation of the latter varies inversely with the number of nodes.

I also desire to call attention to the fact that power may be delivered to the wheel 28 instead of to the shaft 1 and transmitted to either one or both of shafts 1 and 2. If shaft 1 is connected with the machine to be operated, shaft 2 must be provided with a brake mechanism similar to that now shown associated with wheel 28.

In the above specification I have referred to the inertia member 27 as a "flywheel" as it functions by virtue of its inertia to resist sudden changes of speed or direction of movement and I want it understood that this term comprises any shaped member and that I do not therefore want to be limited thereby to a round or cylindrical one, although this is the most suitable shape.

Figure 6:
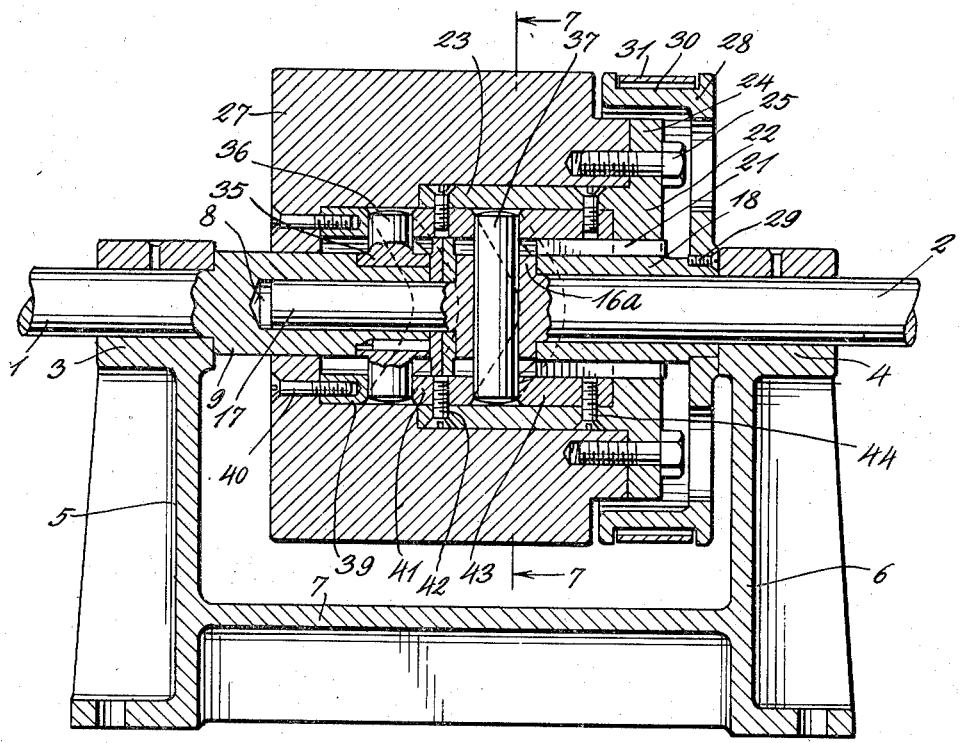
Fig. 6 is a longitudinal section similar to that shown in Fig. 1, but showing a modified construction.
Figure 7:
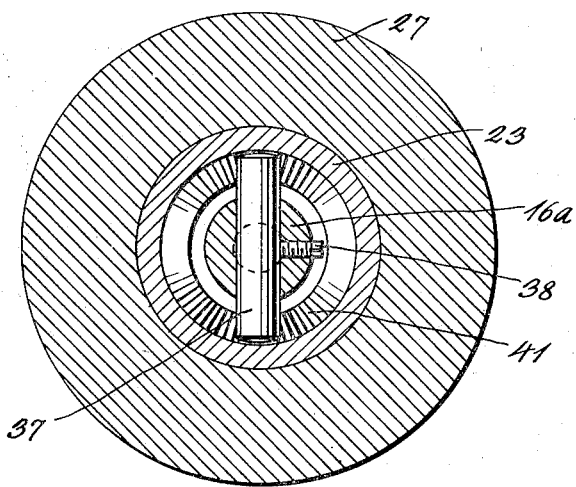
Fig. 7 is a section taken on line 7—7, Fig. 6.

In Figs. 6 and 7 I have illustrated a modified form of construction in which the pins that correspond to pins 33, are carried by the shafts and in which the cam grooves are formed in or by parts carried by the flywheel. This construction is in reality merely a reversal of the cams and pins of Fig. 1 and the operation is identical. In order to reverse the positions of the pins and cam grooves, however, various changes have been made in the construction and these will now be described.

Shaft 1 has secured to its inner end a ring 35 provided with two diametrically opposed pins 36. Shaft 2 has a section 16$^a$ of somewhat larger diameter than the shaft and this is provided with a diametrical opening for the reception of the pin 37, which is held in place therein by a set screw 38. The cylindrical opening in the flywheel instead of being of the same diameter throughout its entire length, has one end of the same diameter as the interior of the sleeve 23. A cam ring 39 is secured to the flywheel by means of screws 40. Another cam ring 41 is spaced from ring 39 so as to form a cam groove of sufficient width to receive the pins 36 and is secured to sleeve 23 by means of screws 42. A third cam ring 43 is spaced from ring 41 a distance equal to the diameter of pin 37 and is secured to sleeve 23 by screws 44. By removing the bolts 25 the sleeve 23 and attached rings 41 and 43 may be separated from the flywheel which makes screws 42 and 44 accessible. The cam grooves between rings 39, 41 and 41, 43 are parallel and correspond to the cam grooves 20 in the modification described above.

As this modified form operates in exactly the same way as the one that has been described above, no attempt will be made to describe the operation any further.

The cam grooves in both of the embodiments are parabolic as this gives the smoothest action. Since the cams and pins are all enclosed in a chamber in the flywheel, they can be easily lubricated as the oil can be contained in the chamber.

Having thus described the invention what is claimed as new is:

1. A transmission device comprising, in combination, two relatively rotatable axially aligned shafts, a flywheel enclosing the adjacent ends of the shafts, and means for connecting the flywheel with each of said shafts, said means comprising cam members having cam grooves and pins engaging said grooves.

2. A transmission device comprising, in combination, two relatively rotatable axially aligned shafts, a flywheel enclosing the adjacent ends of the shafts, means for connecting the flywheel with each of said shafts, said means comprising cam members having cam grooves and pins engaging said grooves and a brake mechanism associated with the flywheel.

3. A transmission device comprising, in combination, two aligned relatively rotatable shafts, a flywheel enclosing adjacent ends of the shafts, the flywheel being movable with respect to both shafts and means comprising a cam having a cam groove, and pins operatively associated with the cam grooves for connecting each of said shafts with the flywheel.

4. A transmission device comprising, in combination, two axially aligned relatively rotatable shafts, a cam member secured to each of the adjacent ends of said shafts, each cam member having an endless cam groove extending around it, each of said cam grooves having a plurality of nodes, an inertia member having a central opening adapted to receive and enclose said cams and pins connected with the inertia member and engaging the cam grooves.

5. A transmission device comprising, in combination, two axially aligned relatively rotatable shafts, cam members secured to the adjacent ends of said shafts, a cylindrical sleeve enclosing the adjacent ends of said shafts, means for connecting the sleeve with each of said shafts, said means comprising a cam having an endless cam groove and a pin having one end in said groove.

6. An inertia transmission device, comprising, in combination, two axially aligned relatively rotatable shafts, an inertia member rotatably carried by said shafts and means for interconnecting the shafts and inertia member so that the latter will be forced to reciprocate whenever it rotates relative to either one of the shafts.

7. An inertia transmission device, comprising, in combination, two axially aligned, relatively rotatable shafts, means for holding the shafts in axial alignment, a brake drum rotatably connected with one of said shafts, said drum having an elongated hub provided on its outer surface with a plurality of splines, an inertia member having an axial chamber enclosing adjacent ends of said shafts, said inertia member having grooves which cooperate with the splines on the hub of the brake drum and means for connecting the inertia member with each of the shafts, said means comprising a cam having an endless cam groove that is concentric with the axis of the shafts and pins having one end projecting into said groove.

8. A transmission device comprising, in combination, two axially aligned, relatively rotatable shafts, a cam member nonrotatably associated with each shaft, an inertia member and means for connecting the inertia member to the cams in such a manner that it will be reciprocated whenever the cam members are rotated relative to each other.

9. A transmission device comprising, in combination, two relatively rotatable shafts, an inertia member surrounding adjacent ends of the shafts, means for supporting said member so that it may be reciprocated and means for reciprocating said member at a rate that is directly proportional to the rate of relative rotation of the shafts.

10. A transmission device comprising, in combination, two relatively rotatable axially aligned shafts, an inertia member surrounding adjacent ends of said shafts, a cam member nonrotatably secured to each of said shafts, the inertia member enclosing said cams, means for interconnecting the inertia member with each of the cams so that the inertia member will be reciprocated when the cams rotate relative to each other and means for applying friction to the inerta member so as to retard its rotation.

In testimony whereof I affix my signature.

JOHN A. MALM.